(12) United States Patent
Tkachenko et al.

(10) Patent No.: US 10,291,048 B2
(45) Date of Patent: May 14, 2019

(54) BATTERY CHARGING BASED ON REAL-TIME BATTERY CHARACTERIZATION

(71) Applicant: GBATTERIES ENERGY CANADA INC., Ottawa (CA)

(72) Inventors: Oleksandr Tkachenko, Ottawa (CA); Mykola Sherstyuk, Ottawa (CA)

(73) Assignee: GBatteries Energy Canada Inc., Ottawa (CA)

( * ) Notice: Subject to any disclaimer, the term of this patent is extended or adjusted under 35 U.S.C. 154(b) by 106 days.

(21) Appl. No.: 15/483,324

(22) Filed: Apr. 10, 2017

(65) Prior Publication Data

US 2017/0302088 A1 Oct. 19, 2017

Related U.S. Application Data

(60) Provisional application No. 62/319,973, filed on Apr. 8, 2016, provisional application No. 62/449,445, filed on Jan. 23, 2017.

(51) Int. Cl.
| | |
|---|---|
| *H01M 10/44* | (2006.01) |
| *H01M 10/46* | (2006.01) |
| *H02J 7/00* | (2006.01) |

(52) U.S. Cl.
CPC ............ *H02J 7/007* (2013.01); *H02J 7/0045* (2013.01); *H02J 7/0047* (2013.01); *H02J 7/0093* (2013.01)

(58) Field of Classification Search
CPC ............. H02J 7/0093; H02J 7/007; H02J 7/04
USPC .......................... 320/107, 139, 140, 141, 145
See application file for complete search history.

(56) References Cited

U.S. PATENT DOCUMENTS

| | | | |
|---|---|---|---|
| 5,481,174 A | 1/1996 | Martin et al. | |
| 6,329,792 B1 | 11/2001 | Dunn et al. | |
| 8,570,001 B2 | 10/2013 | Buhler et al. | |
| 8,896,315 B1 * | 11/2014 | Davies | H02J 7/0019 320/117 |
| 2007/0103109 A1 * | 5/2007 | Meyer | H02J 7/0004 320/103 |
| 2014/0203762 A1 | 7/2014 | Kato et al. | |
| 2014/0363881 A1 * | 12/2014 | Caiafa | H03K 3/57 435/285.2 |
| 2014/0375275 A1 | 12/2014 | Hung et al. | |

OTHER PUBLICATIONS

International Search Report dated Jul. 26, 2017 for PCT Appln. PCT/CA2017/000081; 4 pages.

* cited by examiner

*Primary Examiner* — Edward Tso
(74) *Attorney, Agent, or Firm* — Scott, P.C.

(57) ABSTRACT

A battery charging circuit can produce a pulsed charging current to charge a battery. During charging, without disconnecting the pulsed charging current from the battery, EIS measurements can be made. In other words, the pulsed charging current can serve double-duty, for battery charging and as a drive signal for the EIS measurements. The EIS measurements can be used to alter parameters of the pulsed charging current to improve battery life. In some instances, the parameters of the pulsed charging current can be momentarily changed for the purpose of making the EIS measurements, and then restored subsequent to making the measurements to parameters suitable for battery charging.

13 Claims, 8 Drawing Sheets

BATTERY CHARGING BASED ON REAL-TIME BATTERY CHARACTERIZATION

CROSS REFERENCE TO RELATED APPLICATIONS

Pursuant to 35 U.S.C. § 119(e), this application is entitled to and claims the benefit of the filing date of U.S. Application No. 62/319,973 filed on Apr. 8, 2016, the content of which is incorporated herein by reference in its entirety for all purposes.

Pursuant to 35 U.S.C. § 119(e), this application is entitled to and claims the benefit of the filing date of U.S. Application No. 62/449,445 filed on Jan. 23, 2017, the content of which is incorporated herein by reference in its entirety for all purposes.

BACKGROUND

Electrochemical Impedance Spectroscopy (EIS) has been in use for a number of years to test rechargeable batteries, such as lithium ion batteries. EIS is well suited for observing reactions in the kinetics of electrodes and batteries. In EIS, the impedance of battery over a range of frequencies is measured. Energy storage and dissipation properties of the battery can be revealed by inspecting the resulting frequency response curve. Impedance parameters such as ohmic resistance and charge transfer resistance can be estimated, for example, from a Nyquist plot of frequency response of the battery.

Other parameters that can be measured with use of EIS relate to the double layer effect, which is the formation of two layers of opposite polarity at the interface between electrode and electrolyte. The charge stored on one side is equal in value and opposite in sign with respect to the charge stored on the other side. If one of the two phases is a liquid, there is a minimum distance that the solvated ions can reach. This region of minimum distance is the so-called Helmholtz plane. The region external to the Helmholtz plane is called the outer Helmholtz layer. The ions can be located at distances below the plane. This region is called the inner Helmholtz layer. EIS is used to characterize the double layer. Parameters extracted from such characterization are used together with mathematical model of the phenomenon. Electrochemical insertion, intercalation and alloying are all processes involving the inner layer.

Another set of parameters measurable with use of EIS are diffusion and reaction parameters which change during battery charging, discharging and also are dependant on battery age, health condition and temperature. The commonly used experimental setups to parameterize electrochemical systems are cyclic voltammetry and galvanostatic cycling. In cyclic voltammetry, the potential difference is changed continuously with a fixed slope, called sweep rate. The sweep rate is changed in sign once a maximum or a minimum potential difference is reached. During this process, the current intensity is registered as function of the potential and, in general, the shape depends on the sweep rate. In galvanostatic cycling experiments, the current intensity is imposed and constant. The potential will be measured as function of the total charge passed through the system. In general, the shape of this curve is a function of the current intensity. The current intensity is changed in sign once a maximum or a minimum potential difference is reached. The shape of such curves is related to the reaction mechanism, transport of the reactants from the bulk of the phase to the interface, and transport of the product in the opposite direction The electrode materials have to be stable in the battery electrolyte for the whole potential range used during the battery cycle, and vice versa. Such stability is achieved thanks to the formation of a protective layer called solid electrolyte interphase (SEI). It can be an oxidation/reduction product, in which case it consumes part of the charge of the battery, or a chemical product, formed by contacting the particles with the electrolyte. The SEI influences the kinetic behavior of the electrode, the irreversible charge consumed during cycling, and the cycle life.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure describes techniques for battery charging using charging parameters that can be determined in real time. In various embodiments, a pulse train can be used to produce a charging current for charging a battery. Battery parameters can be measured during the charging. The pulse train can be adjusted based on the measured battery parameters along with ambient conditions to optimize the pulse train for battery charging. In some embodiments, the pulse train can be adjusted, during the time that the battery measurements are made, to comprise pulses that are optimized for the battery measurements.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
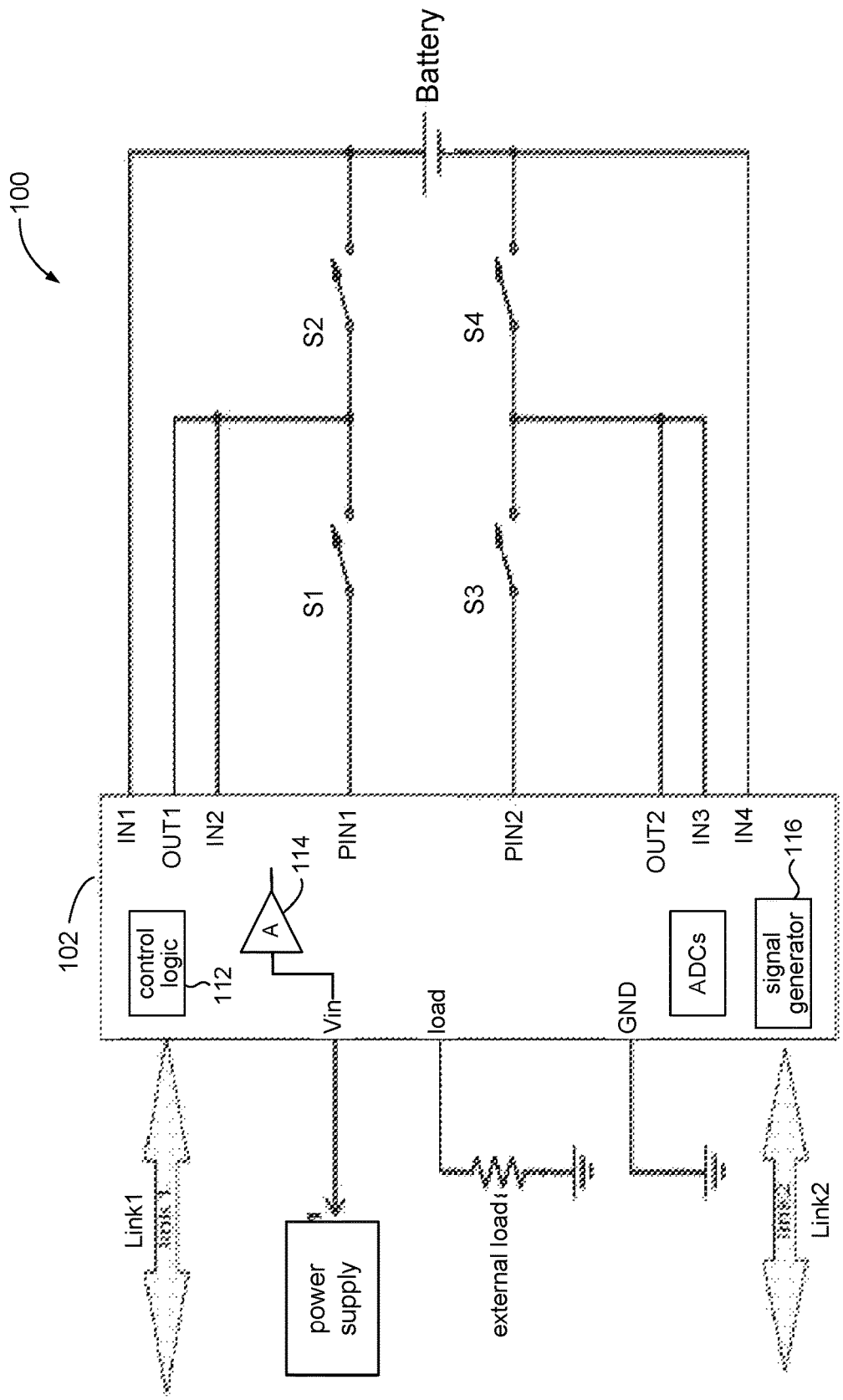
FIG. 1 shows a battery charging system in accordance with an embodiment of the present disclosure.

FIG. 1 illustrates a battery charging system (circuit) 100 for charging a rechargeable battery (e.g. lithium-ion battery cell), in accordance with the present disclosure. The battery charging system 100 can include a controller 102 and switches S1, S2, S3, S4. Controller 102 can include control logic 112 to perform battery charging in accordance with the present disclosure.

An external load can be connected to the controller 102 at its load terminal to receive power from the battery (battery discharging).

An external power supply can be connected to the controller 102 at its Vin terminal to supply power to the battery during battery charging. The controller 102 can include a level shifter 114 to attenuate the voltage provided by the external power supply during battery charging. The level shifter 114 can be an op-amp, a DC-DC converter, or any other suitable level shifting circuit.

The controller 102 can include high speed analog-to-digital converters (ADCs) for converting signals at its inputs In1, In2, In3, In4.

The controller 102 can include a signal generator 116. The signal generator 116, under control of the control logic 112, can produce a sinusoidal signal of a given frequency. The controller 102 can connect the output of the signal generator 116 to either of its outputs Out1, Out2. In some embodiments, for example, the signal generator 116 can produce signals in the range from 0.1 Hz to 100 MHz. In some instances, the signal generator 116 can output a signal at a single frequency. In other instances, the signal generator 116 can sweep through a range of frequencies. Merely to illustrate this point, for example, the controller 102 can operate the signal generator 116 to output signals in the range from 1 Hz to 100 KHz in increments of 10 Hz at 5 second intervals.

The controller 102 includes Pin1 and Pin2. The controller 102 can connect the battery to an external power supply via Pin1 and Pin2, when in charge mode, to be charged by the external power supply. Alternatively, the controller 102 can connect the battery to an external load via Pin1 and Pin2, when in discharge mode, to provide power from the battery to the external load.

The controller 102 can include communication links Link1, Link2 to communicate with external devices. Link1, for example, can be used to communicate aspects of the battery condition to battery management system in an electronic device (not shown) that incorporates the battery charging system 100. Information relating to battery condition includes but is not limited to battery parameters measured in real time, calculations, overall battery health, charge state, history of battery parameters, and the like. In some embodiments, Link 2 can be used for advanced external loads, so-called "smart" loads, to communicate battery state and negotiate optimal functioning modes for both the battery and the external load. In embodiments that comprise multiple battery systems, both Link1 and Link2 can be used to communicate battery condition and optimal modes, respectively, to other elements in the system.

Modes of Operation

The discussion will now turn to a description of the discharge mode and charge mode of operation in the battery charging system 100 in accordance with the present disclosure.

A. Discharge Mode

In discharge mode, the controller 102 can turn OFF or otherwise quiesce the signal generator 116. The controller 102 can operate the switches S1, S2, S3, S4 to the ON state (CLOSED position). The controller 102 can connect PIN1 to the load terminal and Pin2 to the ground (GND) terminal, thus connecting the battery to the external load. In accordance with some embodiment of the present disclosure, during discharge mode the controller 102 may interrupt the delivery of power to the external load to make EIS measurements (described below). For example, a smart load may coordinate with the controller 102 (e.g., vial Link2) to interrupt power for short periods of time (e.g., 50 uS or so).

B. Charge Mode

In charge mode, the controller 102 can operate the signal generator 116 to output signals. The controller 102 can perform a calibration sequence on the signal generator 116. For example, the controller 102 can operate the switches S1, S2, S3, S4 to the OFF state (OPEN position). In this configuration, output from the signal generator 116 can be provided to Out1 and calibration can be performed via In2. Likewise, output from the signal generator 116 can be provided to Out2 and calibration can be performed via In3.

During charging, the controller 102 can alternate between a charging phase where energy (charging current) is provided from the external power supply to the battery and a measurement phase where making EIS measurements are made on the battery. The alternation between charging phase and measurement phase can be performed intermittently, for example, in response to a change in operating conditions (e.g., ambient temperature). The alternation can be periodic, for example, the EIS measurements can be performed at regular intervals from one millisecond to many minutes.

For the charging phase, the controller 102 can operate switches S1, S2, S3, S4 to the ON state and turn OFF or quiesce the signal generator 116 for the charging phase, thus allowing the external power supply to charge the battery.

For the measurement phase, EIS measurements are typically obtained by disconnecting the battery from its charging current path and coupling the battery to a signal source (drive) in the form of band limited white noise. The EIS measurements include measuring the battery's response (e.g., current response) over a given range of frequencies of the drive signal. Accordingly, the controller 102 can operate the switches S1, S3 to the OFF state to disconnect the external power supply from the battery, and turn ON the signal generator 116 thus providing a drive signal to the battery via output Out1 for making EIS measurements. Measurements can be taken by converting signals at input In1 using an ADC at In1. Since the duration of the measurement can be relatively short (e.g., ranging from tens of microseconds to a few seconds), the measurement can occur without disrupting the normal operation of the battery. For example, where the battery is incorporated into a smart phone, the main processor may choose to insert the EIS measurements at moments it deems the smart phone to be in idle or near idle.

In some embodiments, measurements may be continuous. The controller 102 operate switches S1, S2, S3, S4 to the ON state and turn ON the signal generator 116, thus allowing both power from the external power supply and signals from the signal generator 116 to reach the battery. EIS measurements can be made simultaneous with the battery being charged.

C. Adapting Battery Charging

It is understood that EIS measurements are correlated with electrochemical and even mechanical phenomena inside the battery. These electrochemical and mechanical phenomena manifest themselves as various parameters of the battery, including for example, state of charge (SOC), capacitance of the double layer, thickness of the double layer, electrolyte oxidation level, corrosion of the current collectors, degradation of the active material binder, diffusion rates within the battery, and other physical aspects of the battery. The EIS measurements can be analyzed as a sum of sinusoidal functions (a Fourier series). In some embodiments, the analysis can be made using a suitable fast Fourier transform (FFT) technique.

In accordance with the present disclosure, the controller 102 can adapt charging of the battery based on the EIS measurements. For example, the charging current may be reduced (e.g., by reducing the gain of level shifter 114) when the EIS measurements indicate that diffusion rates in the battery are dropping. This may be desirable under some circumstances to increase the life cycle of the battery. By inserting EIS measurements at certain intervals, the charging process can be adapted in real time to adjust the charging current to improve the life cycle of the battery.

Further in accordance with the present disclosure, the controller 102 can analyze the EIS measurements to assess the condition of the battery and report the results from the analysis. In some embodiments, for example, the results may be reported (e.g., via Link1) to a battery management system.

Figure 2:
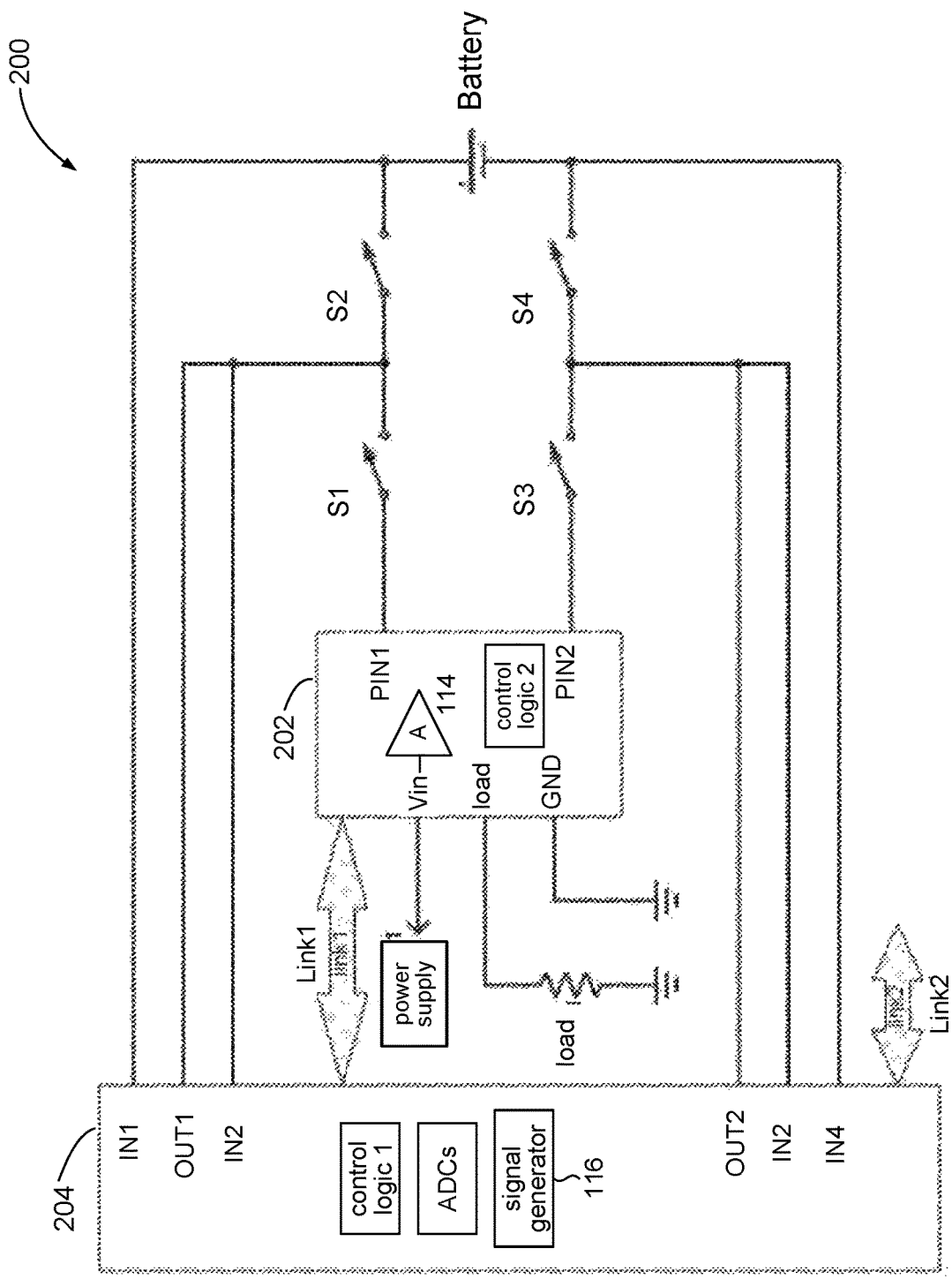
FIG. 2 shows a variation of the battery charging system shown in FIG. 1 in accordance with an embodiment of the present disclosure.

FIG. 2 shows a battery charging system (circuit) 200 in accordance with another embodiment of the present disclosure. Battery charging system 200 can comprise first controller 202 and a second controller 204. The circuit components described in controller 102 of battery charging system 100 are apportioned to the first and second controllers 202, 204 of battery charging system 200. Likewise, the control logic 112 in controller 102 of battery charging system 100 is apportioned to control logic 1 and control logic 2 in battery charging system 200. Operation of battery charging system 200 is the same as battery charging system 100.

Figure 3:
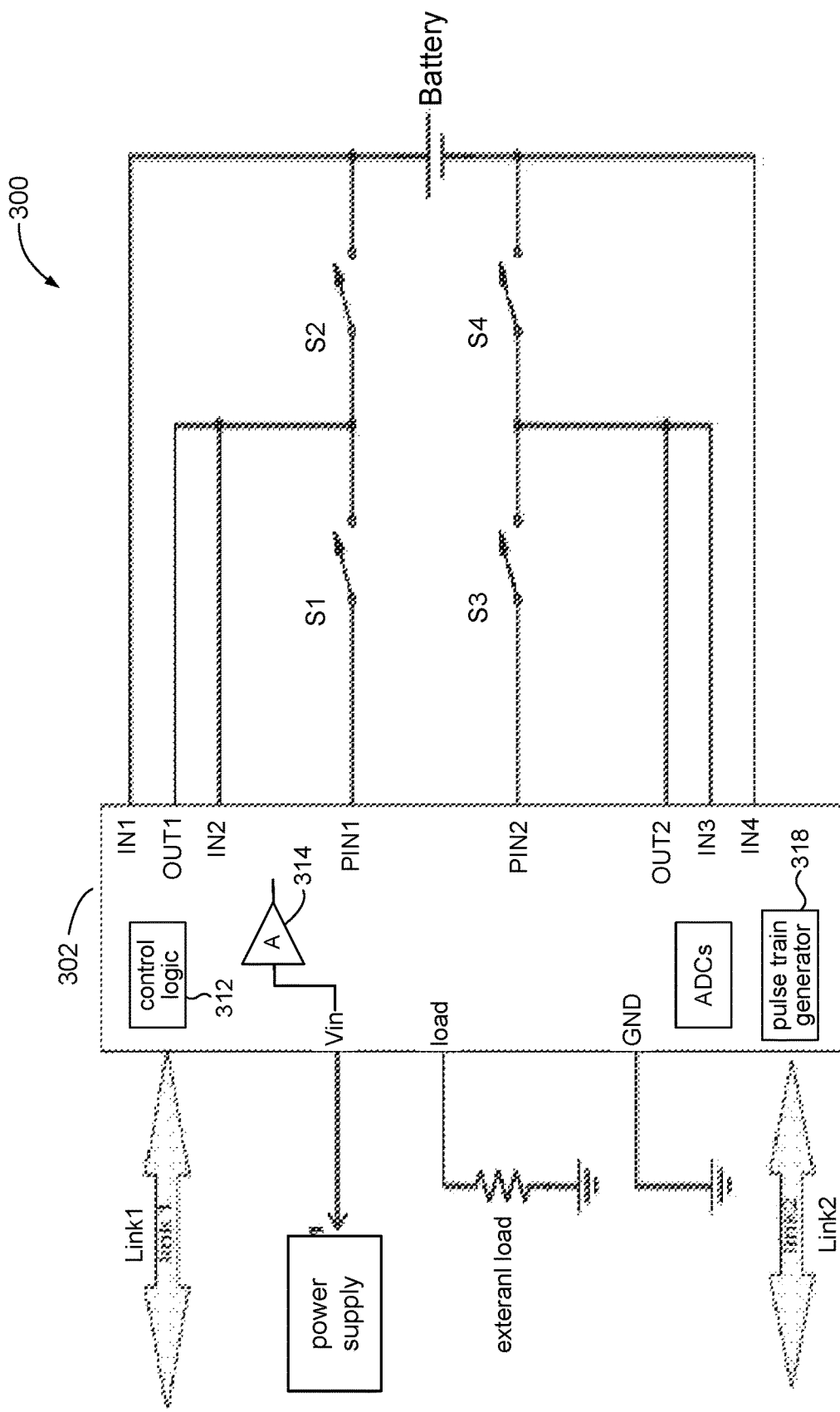
FIG. 3 shows a battery charging system in accordance with an embodiment of the present disclosure that uses pulsed charging.

FIG. 3 illustrates a battery charging system (circuit) 300 for charging a rechargeable battery (e.g. lithium-ion battery cell), in accordance with the present disclosure. The battery charging system 300 can include a controller 302 and switches S1, S2, S3, S4. The controller 302 may include control logic 312 to perform battery charging in accordance with the present disclosure.

An external load can be connected to the controller 302 at its load terminal to receive power from the battery (battery discharging).

An external power supply can be connected to the controller 302 at its Vin terminal to supply power to the battery during battery charging. The controller 302 can include a level shifter 314 to attenuate the voltage provided by the external power supply during battery charging. The level shifter 314 can be an op-amp based design, a DC-DC converter, or any other suitable level shifting circuit.

The controller 302 can include high speed analog-to-digital converters (ADCs) for converting signals at its inputs In1, In2, In3, In4.

The controller 302 can include a pulse train generator 316. The pulse train generator 316, under the control of control logic 312, can produce a train of pulses. The controller 302 can connect the output of the pulse train generator 316 to either of its outputs Out1, Out2.

Figure 4:
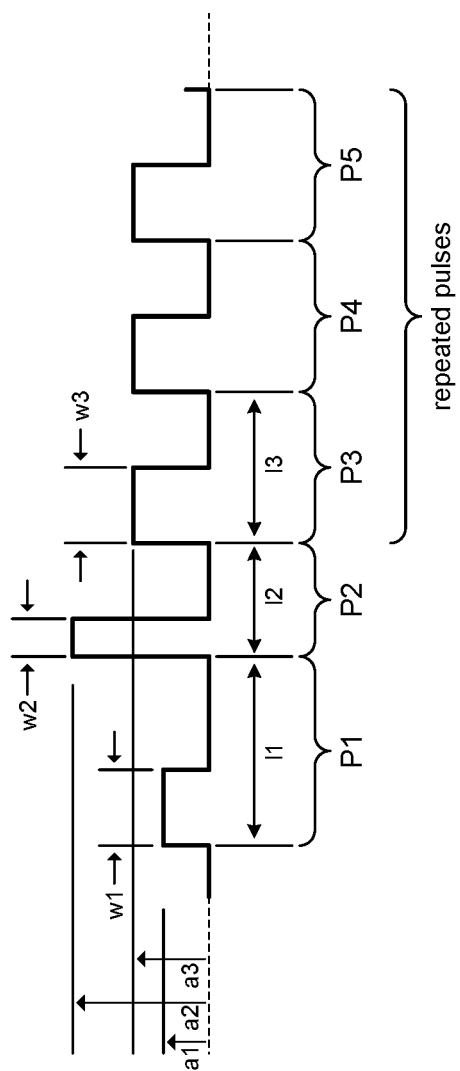
FIG. 4 depicts an illustrative example of a pulse train.

The controller 302 can control the pulse amplitude, pulse length (duration, period) and pulse width of each pulse. On the one hand, for example, the controller 302 can produce a train of pulses having a constant duty cycle. On the other hand, the controller 302 can produce a pulse train of pulses having different pulse amplitudes, pulse lengths, and pulse. FIG. 4, for example, shows a portion of a pulse train comprising pulses P1, P2, P3, P4, P5. Pulses P1-P3 have different pulse amplitudes (a1≠a2≠a3), pulse lengths (l1≠l2≠l3) and different pulse widths (w1≠w2≠w3). The pulse train may include a repetition of pulses having the same pulse period and pulse width; for example, pulses P3, P4, and P5 show an example of repeated pulses. In general, the pulse train may comprise pulses having any combination of the same or different amplitudes, lengths, and widths. In some embodiments, the pulses can be rectangular. In other embodiments, the pulses can have other shapes.

The controller 302 includes Pin1 and Pin2. The controller 302 can connect the battery to an external power supply via Pin1 and Pin2, when in charge mode, to be charged by the external power supply. Alternatively, the controller 302 can connect the battery to an external load via Pin1 and Pin2, when in discharge mode, to provide power from the battery to the external load.

The controller 302 can include the same communication links Link1, Link2 for communicating with external devices as controller 102.

Figure 5:
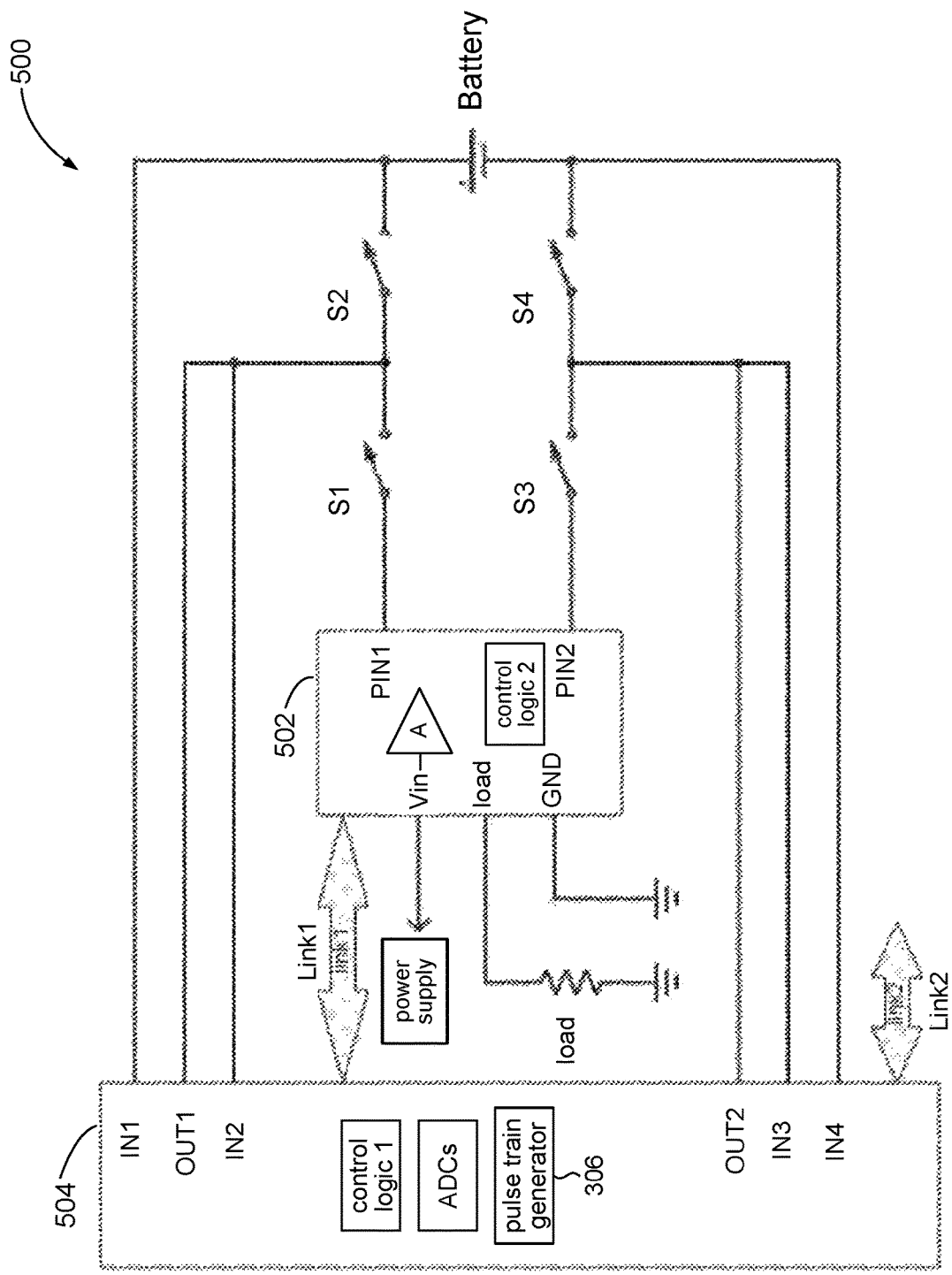
FIG. 5 shows a variation of the battery charging system shown in FIG. 3 in accordance with an embodiment of the present disclosure.

FIG. 5 shows a battery charging system (circuit) 500 in accordance with another embodiment of the present disclosure. Battery charging system 500 can comprise first controller 502 and a second controller 504. The circuit components described in controller 302 of battery charging system 300 are apportioned to the first and second controllers 502, 504 of battery charging system 500. Likewise, the control logic 312 in controller 302 of battery charging system 100 is apportioned to control logic 1 and control logic 2 in battery charging system 500. Operation of battery charging system 500 is the same as battery charging system 300.

Figure 6:
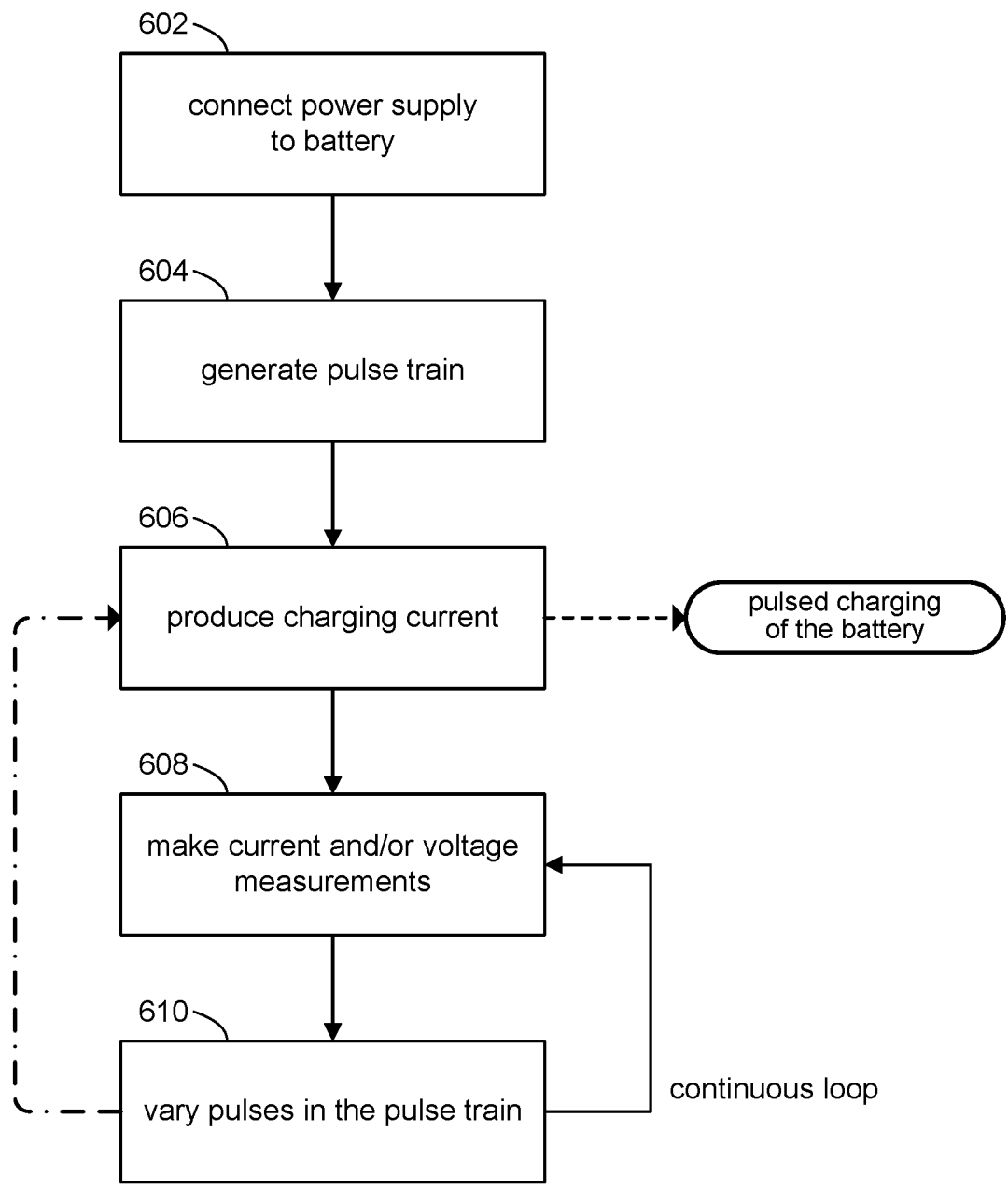
FIG. 6 shows processing for pulsed charging in accordance with the present disclosure using continuous EIS measurements.

Referring to FIG. 6 and with reference to FIG. 3, the discussion will now turn to a high level description of processing by control logic 312 for pulse charging a battery in accordance with the present disclosure.

At block 602, the control logic 312 can configure connections in the controller 302 to connect the external power supply to the battery. For example, the control logic 312 can connect Pin1 and Pin2 respectively to the Vin and GND terminals, and operate switches S1, S2, S3, S4 to the ON state.

At block 604, the control logic 312 can operate the pulse train generator 318 to produce a pulse train. The control logic 312 may choose initial settings for pulse amplitude, pulse length, and pulse duration for pulses comprising the pulse train based on previously stored measured battery parameters.

At block 606, the control logic 312 can operate switch S2 in accordance with the pulse train to generate a pulsed charging current by modulating the output of the external power supply, thus initiating pulse charging of the battery. The pulse amplitudes, pulse lengths, and pulse widths of the pulsed charging current are determined by the pulse amplitudes, pulse lengths, and pulse widths of pulses in the pulse train. In some embodiments, the pulse amplitudes in the pulse train can be used to set the gain of level shifter 314 and hence amplitudes in the pulsed charging current.

At block 608, while the battery is receiving the pulsed charging current, the control logic 312 can make EIS measurements on the battery, including one or more measurements of current flow into the battery and/or one or more measurements of voltage across the battery. For example, the control logic 312 can operate the ADCs corresponding to inputs In1 and In4 for making the measurements without disconnecting the pulsed charging current from the battery. In fact, the pulsed charging current serves as the drive signal for the battery when the EIS measurements are made.

At block 610, the control logic 312 can accumulate the EIS measurements with previously made EIS measurements. The control logic 312 can analyze the accumulated EIS measurements to assess parameters of the battery as discussed above. Based on the assessed battery parameters, the control logic 312 can vary any one or more of the pulse amplitude, pulse length, and pulse width of pulses comprising the pulse train, which in turn affects the pulsed charging current generated at block 606. For example, pulse amplitude may be adjusted depending the SOC of the battery. Likewise, pulse length may be adjusted when ion diffusion levels have reached a predetermined threshold, and so on. In this way, pulsed charging of the battery can be optimized, in real time, using EIS measurements of the battery that are made simultaneous with battery charging to increase the cycle life of the battery.

When the charging current is very high (globally or locally in some areas of the battery), the transport rate of lithium ions (Li+) to the anode can exceed the rate that Li+ can be inserted (intercalated). Under these conditions, Li+ may deposit as metallic Li, which can lead to the growth of dendrites. The dendrites can create short circuits, which can degrade the battery's life and its durability and in the worst case cause a fire. EIS measurements made in accordance with the present disclosure be used to detect the development of metal plating formation, even at the very early stages of development.

Accordingly in accordance with some embodiments, the control logic 312 can include analyses to detect the occurrence of metal plating such as dendrite formation, and in response can alter the pulse parameters to reduce the charging current, or interrupt the charging process altogether. In some embodiments, the control logic 312 can reduce the battery's usable capacity, and allow charging to continue only up to the reduce capacity. The battery could still be usable, albeit at reduce capacity.

In some embodiments, the control logic 312 can initiate a discharge sequence to discharge the battery in a controlled manner to reduce the charge level in the battery (or completely deplete the battery) to minimize the risk of a fire hazard. In some instances, the control logic 312 can disable use of the battery entirely. In some instances, the control logic 312 can also communicate the detection of metal plating to a battery management system (e.g., over Link1), which can issue an alarm or other indication to the user.

FIG. 6 shows that in some embodiments, the control logic 312 can continuously make EIS measurements during the time that battery charging is going on. For example, with each iteration, one or more current and/or voltage measurements can be made. The EIS measurements can be combined with previous EIS measurements and analyzed (e.g., Fourier analysis). Battery parameters discussed above can be assessed from the analysis results, and then used to vary parameters (e.g., amplitude, length, and width) of the pulses in the pulse train for the next iteration. The next iteration can be performed without delay (continuous).

Figure 7:
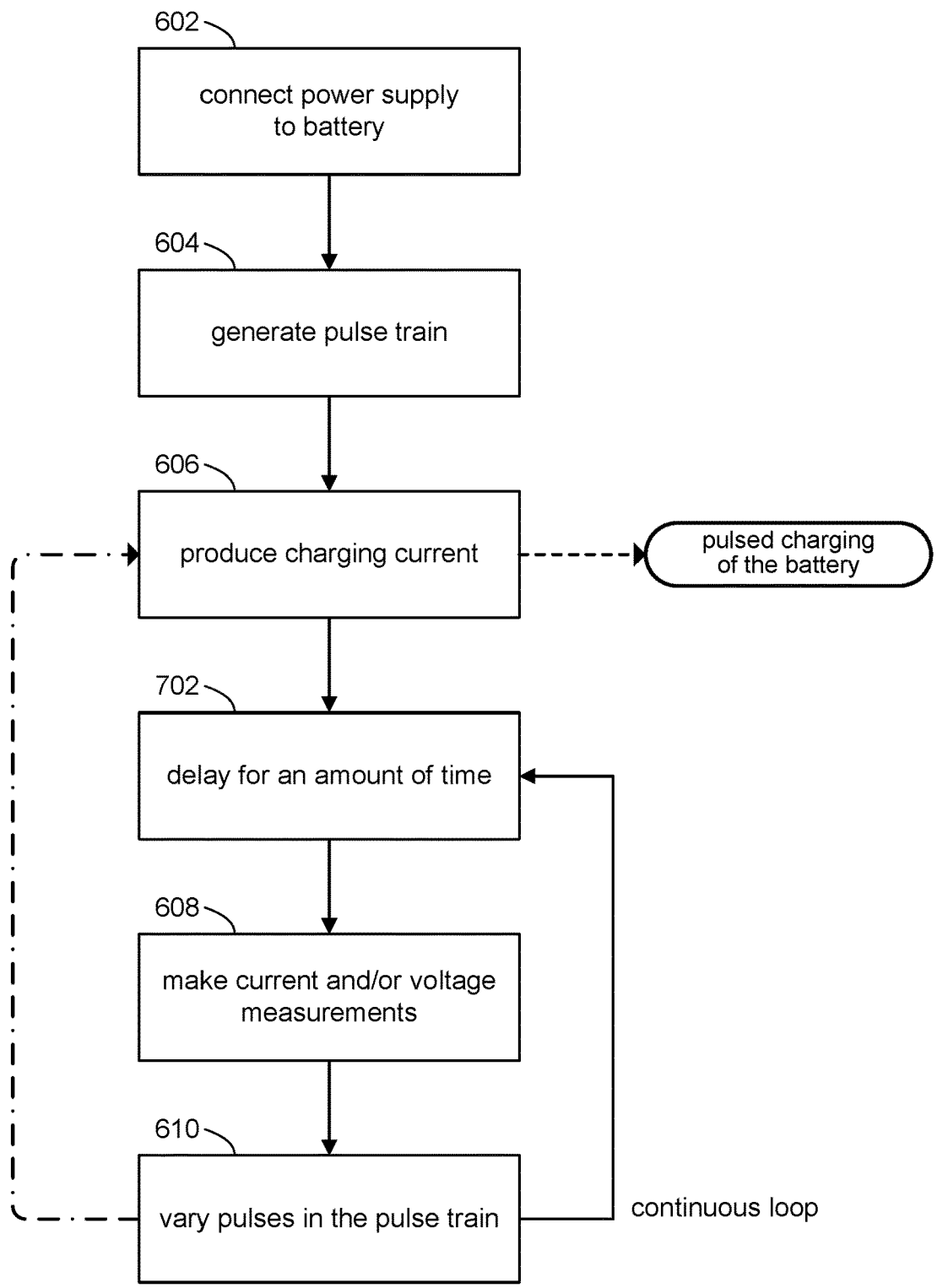
FIG. 7 shows processing for pulsed charging in accordance with the present disclosure using intermittent EIS measurements.

FIG. 7 shows that in some embodiments, the control logic 312 can make intermittent EIS measurements. The processing in FIG. 7 is the same as in FIG. 6 with the inclusion of delay at block 702 to provide delay between making EIS measurements (block 608). In some embodiments, for example, the delay may be a predetermined fixed value of time. The delay may vary from one iteration to the next. In other embodiments, EIS measurements may be triggered by the occurrence of one or more predetermined events (e.g., change in operating conditions such as ambient temperature); the delay arising from the time between such events.

In the foregoing embodiments the pulsed charging current that drives the battery at the time the EIS measurements are made, is optimized for charging. In other words, the pulse parameters are adjusted based on previously made EIS measurements, as discussed above. In some embodiments, the pulse parameters of the pulsed charging current may be momentarily altered for the purposes of making EIS measurements (i.e., optimized for measurements), and then restored to pulse parameters optimized for charging. This aspect of the present disclosure will now be described.

Figure 8:
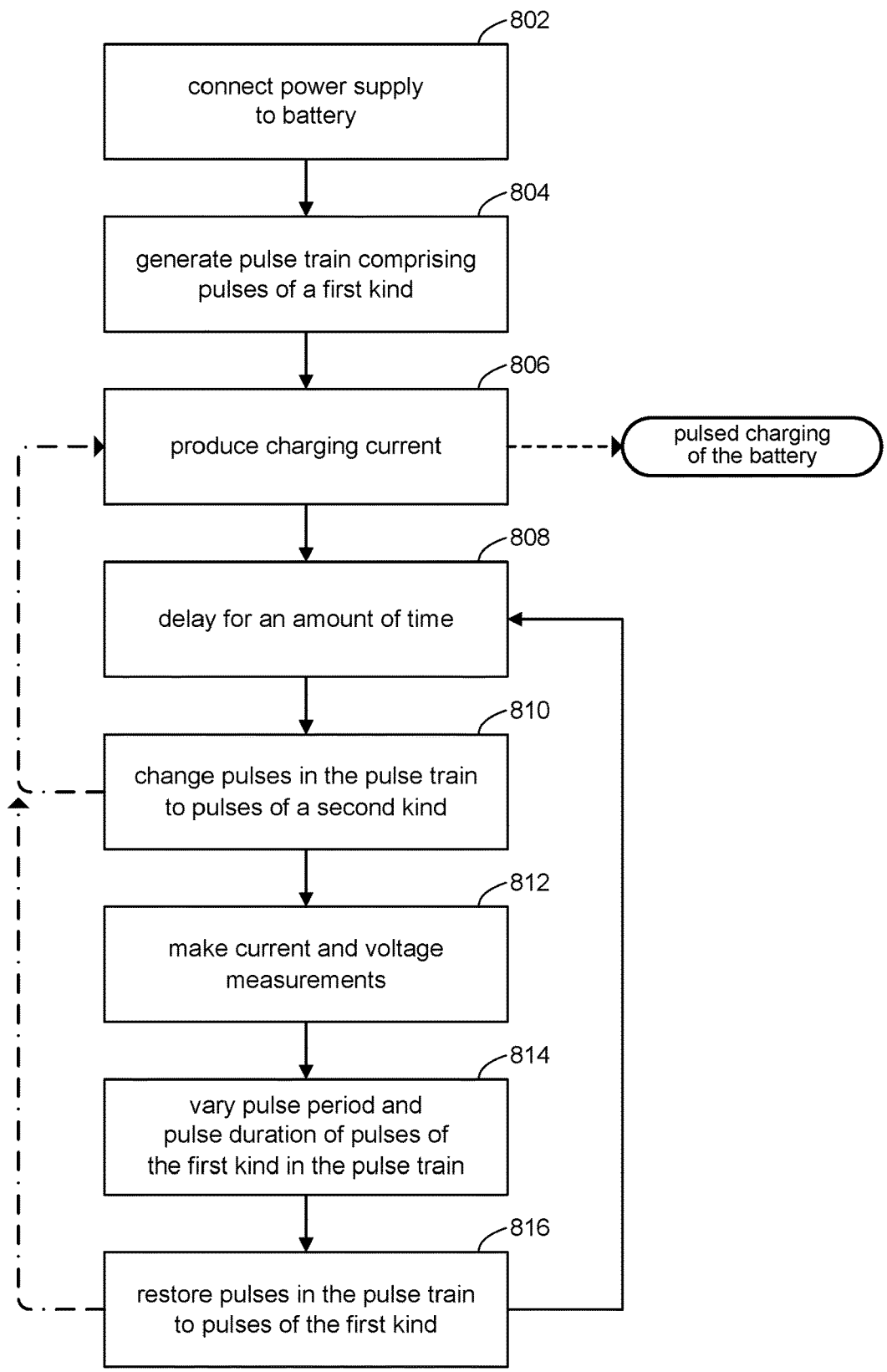
FIG. 8 shows processing for pulsed charging in accordance with the present disclosure using pulses suitable for EIS measurements.

Referring to FIG. 8 and with reference to FIG. 3, the discussion will now turn to a high level description of processing by control logic 312 for pulse charging a battery in accordance with the present disclosure.

At block 802, the control logic 312 can configure connections in the controller 302 to connect the external power supply to the battery. For example, the control logic 312 can connect Pin1 and Pin2 respectively to the Vin and GND terminals, and operate switches S1, S2, S3, S4 to the ON state.

At block 804, the control logic 312 can operate the pulse train generator 318 to produce a pulse train. The control logic 312 may choose initial settings for pulse amplitude, pulse length, and pulse duration for pulses comprising the pulse train based on previously stored measured battery parameters. As such, the pulse train initially comprises first kinds of pulses to optimize battery charging.

At block 806, the control logic 312 can operate switch S2 in accordance with the pulse train to generate a pulsed charging current by modulating the output of the external power supply, thus initiating pulse charging of the battery. The pulse amplitudes, pulse lengths, and pulse widths of the pulsed charging current are determined by the pulse amplitudes, pulse lengths, and pulse widths of pulses in the pulse train. In some embodiments, the pulse amplitudes in the pulse train can be used to set the gain of level shifter 314 and hence the amplitudes in the pulsed charging current.

At block 808, the control logic 312 can provide delay before proceeding to the next block. In some embodiments, for example, the delay may be a predetermined fixed value of time. The delay may vary from one iteration to the next. In other embodiments, EIS measurements may be triggered by the occurrence of one or more predetermined events (e.g., change in operating conditions such as ambient temperature); the delay arising from the time between such events.

At block 810, the control logic 312 can set the pulse train generator 316 to generate second kinds of pulses that are more suitable for making EIS measurements. In some embodiments, for example, the pulse train can be a pseudo-random binary pulse sequence, which approximates a form of band-limited white noise, that produces a pulsed charging current having a pulse amplitude in the range of 0.1 C to 20 C and pulse durations in the range from 1 mS to 5000 mS. Consequently, while the resulting pulsed charging current continues to charge the battery, it will no longer be optimized for battery charging, but rather for making EIS measurements. The momentary change in pulse parameters, however, should not be detrimental to the battery charging process because the EIS measurements take on the order of several seconds or less.

At block 812, while the battery is receiving the pulsed charging current, the control logic 312 can make EIS measurements on the battery, including one or more measurements of current flow into the battery and/or one or more measurements of voltage across the battery. For example, the control logic 312 can operate the ADCs corresponding to inputs In1 and In4 for making the measurements without disconnecting the pulsed charging current from the battery. In fact, the pulsed charging current serves as the drive signal for the battery when the EIS measurements are made.

At block 814, the control logic 312 can adjust the pulse parameters for battery charging as discussed above, for example, in connection with block 610 in FIG. 6.

At block 816, the control logic 312 can set pulse train generator 316 to generate pulses of the first kind to resume battery charging using a pulse train that is optimized for battery charging. Control logic 312 can then return to block 808 to repeat the process.

EIS measurements can be performed using any of several possible implementations. In one such implementation, for example, a programmable current source is controlled by an integrated circuit, and the EIS measurements are done continuously. In another implementation where cost control is a factor, the battery's regular charger can be used instead of a separate current source, and its current output can be controlled to generate a suitable pulse train, having parameters selected based on results of the EIS measurements. For example, a laptop computer or smart phone already contains a charging integrated circuit responsible for charging the battery. The charging integrated circuit can be directly controlled through a communication bus such as I²C or 5MBus®.

Embodiments in accordance with the present disclosure, can employ circuitry coupled to the battery cell. Monitoring circuitry in the controller (e.g., 302) can be implemented on ASICs or FPGAs, where the monitoring circuitry monitors, senses, detects and/or samples, on an intermittent, continuous and/or periodic basis, characteristics of the battery including, for example, the impedance of the battery, the terminal voltages and the temperature. The control logic (e.g., 312) can acquires data from the monitoring circuitry and calculate one or more charge signal characteristics (e.g., charge current) and, if appropriate (e.g., to alleviate, minimize and/or reduce the adverse impact of the charging process on the state of the health of the battery), adapt the charging process, for example, by controlling the pulse parameters.

Circuitry for adaptive charging techniques of the present disclosure may employ any monitoring circuitry and techniques, whether that described herein, now known or later developed, to acquire EIS measurements employed by the control circuitry to adapt the charging profile of the battery; all such monitoring circuitry and techniques are intended to fall within the scope of the present inventions.

Similarly, embodiments of the present disclosure may employ any control circuitry and charging circuitry whether those described herein, now known or later developed, to charge the battery (or cells thereof), as well as to adapt the charging process to, for example, alleviate, minimize and/or reduce the adverse impact of the charging operation on the state of the health of the battery.

Notably, a "circuit" means, among other things, single component (for example, integrated circuit or ASIC) or a multiplicity of components (whether in integrated circuit form, discrete form or otherwise), which are active and/or passive, and which are coupled together to provide or perform a desired operation. In addition, "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
   connecting a power supply to a battery;
   generating a pulse train comprising a plurality of pulses;
   producing pulsed charging current from the power supply by modulating the power supply with the pulse train, the battery thereby being charged by the pulsed charging current;
   simultaneous with charging the battery with the pulsed charging current, making a plurality of measurements of at least one of current or voltage, of the battery;
   generating measurement-optimized pulses in the pulse train concurrent with making the plurality of measurements,
   wherein making the plurality of measurements includes making the plurality of measurements based on pulsed charging current that is produced from the measurement-optimized pulses; and
   varying, based on the plurality of measurements, the pulsed charging current as the battery is being charged, wherein varying the pulsed charging current includes varying at least one of pulse lengths and pulse durations, of the plurality of pulses that comprise the pulse train.

2. The method of claim 1, wherein varying the pulsed charging current further includes varying pulse amplitudes of the plurality of pulses that comprise the pulse train.

3. The method of claim 1, wherein the plurality of measurements are made without disconnecting the pulsed charging current from the battery.

4. The method of claim 1, wherein generating the measurement-optimized pulses comprise generating a pseudo-random binary pulse sequence, and wherein the pulsed charging current produced using the pseudo-random binary pulse sequence is characterized as a form of band-limited white noise.

5. The method of claim 1, further comprising continuously making the plurality of measurements while the battery is receiving the pulsed charging current.

6. The method of claim 1, wherein making the plurality of measurement comprises making the plurality of measurements intermittently during the time that the battery is receiving the pulsed charging current.

7. A circuit comprising:
   a terminal for a connection to an external power supply;
   a terminal for a connection to a battery;
   a pulse train generator configured to generate a pulse train comprising a plurality of pulses; and
   control logic operative to:
      produce pulsed charging current using the external power supply by modulating the external power supply with the pulse train, the battery thereby being charged by the pulsed charging current;
      simultaneous with charging the battery with the pulsed charging current, make a plurality of measurements of at least one of current or voltage, of the battery;
      generate measurement-optimized pulses in the pulse train concurrent with making the plurality of measurements,
      wherein the plurality of measurements are based on pulsed charging current that is produced from the measurement-optimized pulses; and
      vary, based on the plurality of measurements, the pulsed charging current as the battery is being charged, wherein to vary the pulsed charging current, the control logic is operative to vary at least one of pulse lengths and pulse durations, of the plurality of pulses that comprise the pulse train.

8. The circuit of claim 7, wherein to vary the pulsed charging current, the control logic is further operative to vary pulse amplitudes of the plurality of pulses that comprise the pulse train.

9. The circuit of claim 7, wherein the plurality of measurements are made without disconnecting the pulsed charging current from the battery.

10. The circuit of claim 7, wherein the measurement-optimized pulses comprise a pseudo-random binary pulse sequence, and wherein the pulsed charging current produced using the pseudo-random binary pulse sequence is characterized as a form of band-limited white noise.

11. The circuit of claim 7, wherein the control logic is operative to continuously make the plurality of measurements while the battery is receiving the pulsed charging current.

12. The circuit of claim 7, wherein the control logic is operative to make the plurality of measurements intermittently during the time that the battery is receiving the pulsed charging current.

13. A circuit comprising:
   means for connecting a power supply to a battery;
   means for generating a pulse train comprising a plurality of pulses;
   means for producing pulsed charging current from the power supply by modulating the power supply with the pulse train, the battery thereby being charged by the pulsed charging current;
   means for making a plurality of measurements of at least one of current or voltage, of the battery, simultaneous to the battery being charged with the pulsed charging current;
   means for generating measurement-optimized pulses in the pulse train concurrent with making the plurality of measurements so that the plurality of measurements based on pulsed charging current that is produced from the measurement-optimized pulses; and
   means for varying the pulsed charging current as the battery is being charged based on the plurality of measurements, wherein varying the pulsed charging current includes varying at least one of pulse lengths and pulse durations, of the plurality of pulses that comprise the pulse train.

\* \* \* \* \*